Feb. 12, 1963   M. R. LEICHTFUSS   3,077,071
EXHAUST SYSTEM FOR TURBOCHARGED ENGINE
Filed April 28, 1960   4 Sheets-Sheet 1
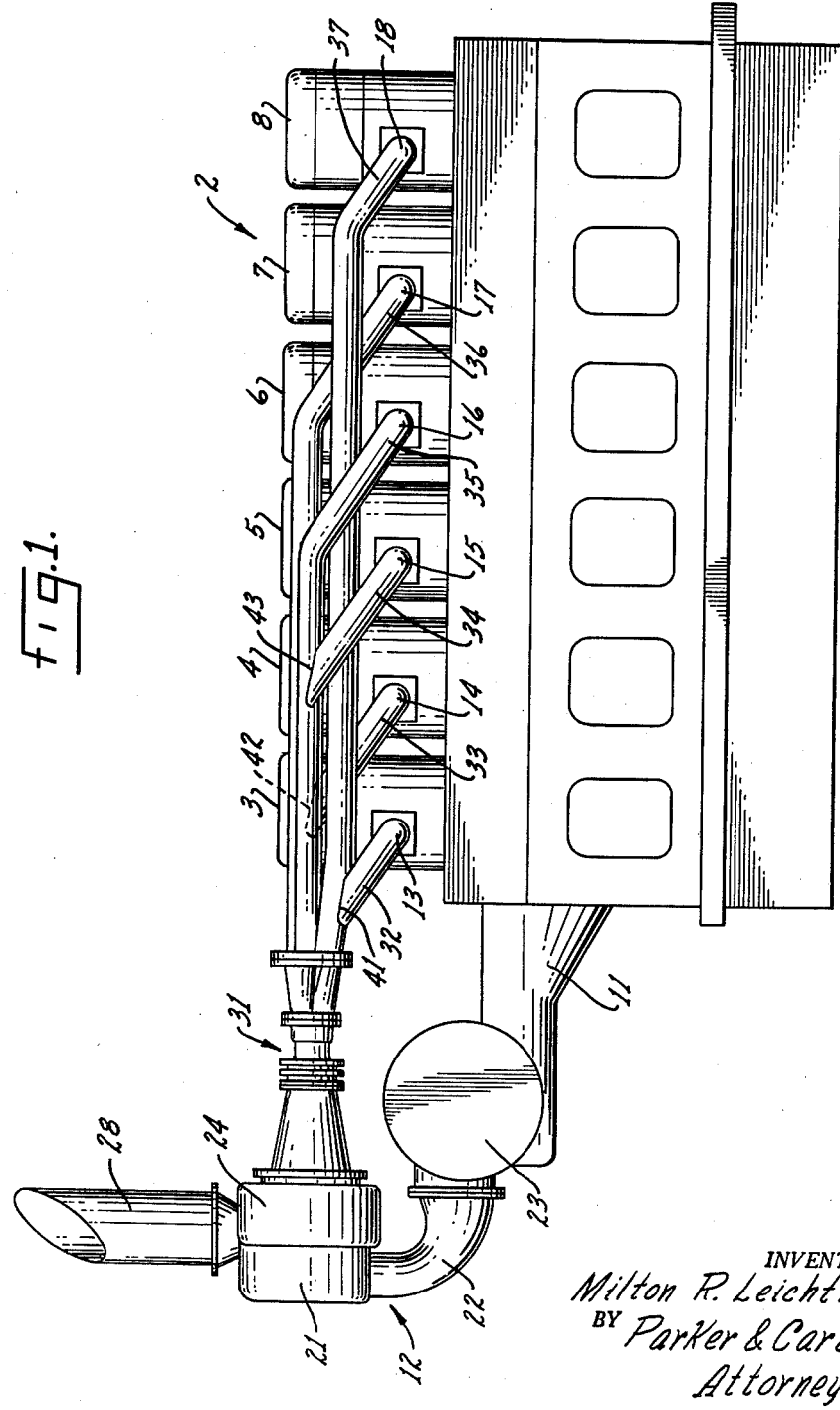
INVENTOR.
Milton R. Leichtfuss,
BY Parker & Carter
Attorneys.

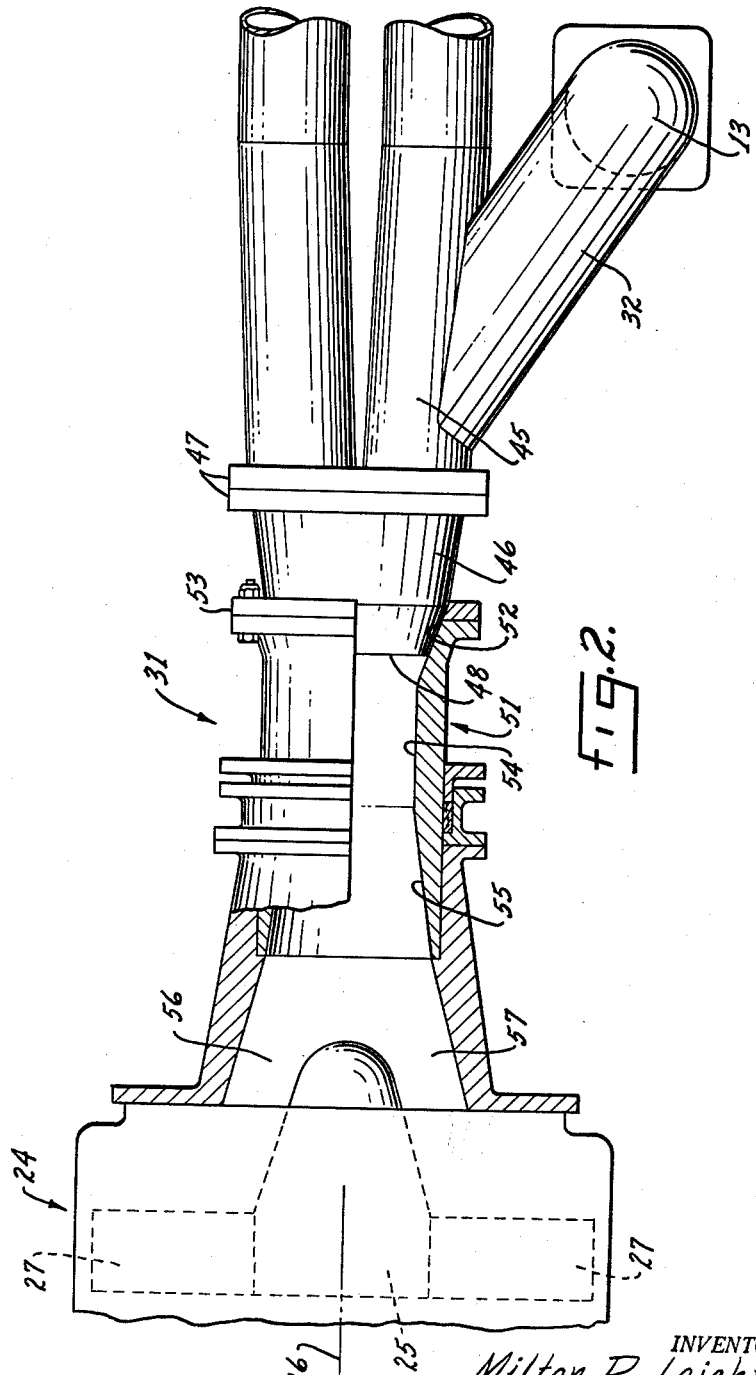

INVENTOR.
Milton R. Leichttuss,
BY Parker & Carter
Attorneys.

INVENTOR.
Milton R. Leichtfuss,
BY Parker & Carter
Attorneys.

United States Patent Office 3,077,071
Patented Feb. 12, 1963

3,077,071
EXHAUST SYSTEM FOR TURBOCHARGED ENGINE
Milton R. Leichtfuss, Hales Corners, Wis., assignor to Nordberg Manufacturing Company, Milwaukee, Wis., a corporation of Wisconsin
Filed Apr. 28, 1960, Ser. No. 25,458
2 Claims. (Cl. 60—13)

This invention is in the field of engines and is concerned with an exhaust system for driving an exhaust driven supercharger.

A primary object of the invention is an exhaust system for an engine and exhaust driven supercharger which avoids a pressure build-up in the exhaust elbow during blow down.

Another object is an exhaust system of the above type which reduces or avoids reflected pressure waves.

Another object is an exhaust system of the above type which reduces engine pumping losses.

Another object is an exhaust system of the above type which has a minimum of restriction.

Another object is an exhaust system which will give a rapid turbocharger response to sudden load.

Other objects will appear from time to time in the ensuing specification and drawings in which:

FIGURE 1 is a side view of an engine with an exhaust driven supercharger;

FIGURE 2 is a side view of a part of the exhaust system of FIGURE 1, partly in section and on an enlarged scale;

Figure 6:
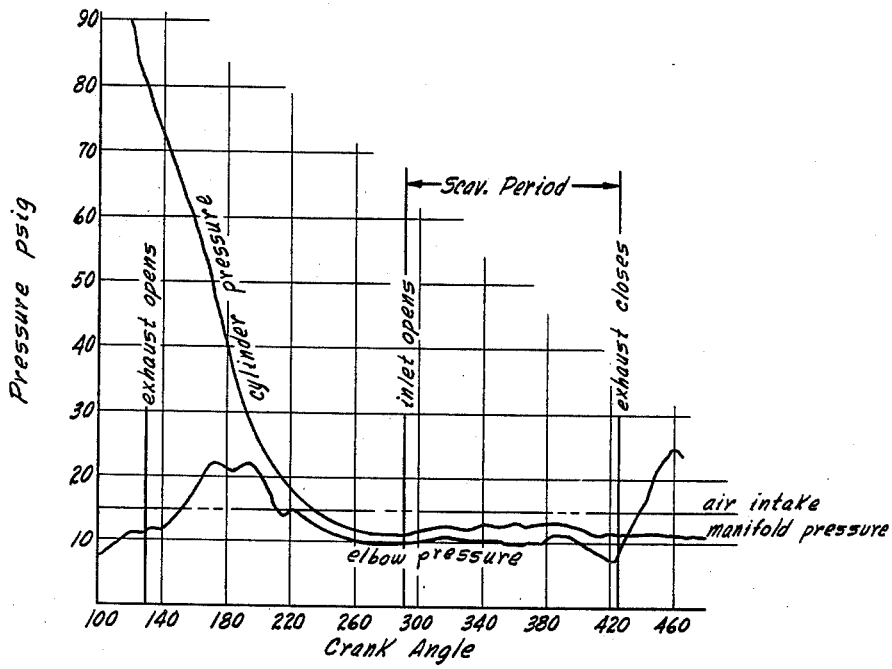
FIGURE 6 is a chart similar to FIGURE 4 of a full admission system and an energy converter.

An engine is shown generally at 2 in FIGURE 1, and has any number of cylinders 3, 4, 5, 6, 7 and 8, respectively. An air intake manifold 11 delivers air under pressure from a conventional turbocharger, shown generally at 12, to air inlet ports, not shown. Exhaust gases are discharged from the cylinders through exhaust ports 13, 14, 15, 16, 17 and 18, respectively. Although a six cylinder engine is shown and described, it will be understood that any multi cylinder engine could be used.

The turbocharger 12 includes a compressor 21 for delivering air through a pipe 22 and intercooler 23 to the air intake manifold 11. The compressor is driven by an "impulse" type turbine 24. As shown in FIGURE 2, the turbine 24 includes a turbine wheel 25 mounted for rotation about an axis 26, and having turbine buckets 27 annularly spaced on the wheel. An exhaust stack 28 is connected to the turbine in FIGURE 1.

Conducting the exhaust gases from the exhaust ports to the turbine 25 is an exhaust system, shown generally at 31. The exhaust system includes a series of exhaust pipes or elbows 32, 33, 34, 35, 36 and 37 connected to corresponding exhaust ports. Passages 32, 33 and 34 join with passages 37, 36 and 35, respectively, at 41, 42 and 43. Although in this case pairs of exhaust passages are joined to form three main passages, it will be understood that four main passages might be formed in any eight cylinder engine, for example, or four or six main passages formed in a twelve cylinder engine. Also, I might connect two, three or four exhaust elbows to each pipe.

As seen in FIGURE 2, each of the passages has a cylindrical extended portion 45 and a converging end portion 46. The converging end portions 46 are held together by ring clamps 47 and discharge at a common point 48.

Overlying the discharge end 48 of the exhaust passages is the mount of a venturi or energy convertor 51 which includes a converging mouth portion 52 secured to the exhaust passages by a clamp 53. The mouth portion 52 empties into a throat 54 to which is connected an extended diffuser portion 55. At the discharge end of the diffuser portion is an annular outlet, designated 56 and 57, which is aligned to direct the exhaust gases against the turbine buckets.

Figure 3:
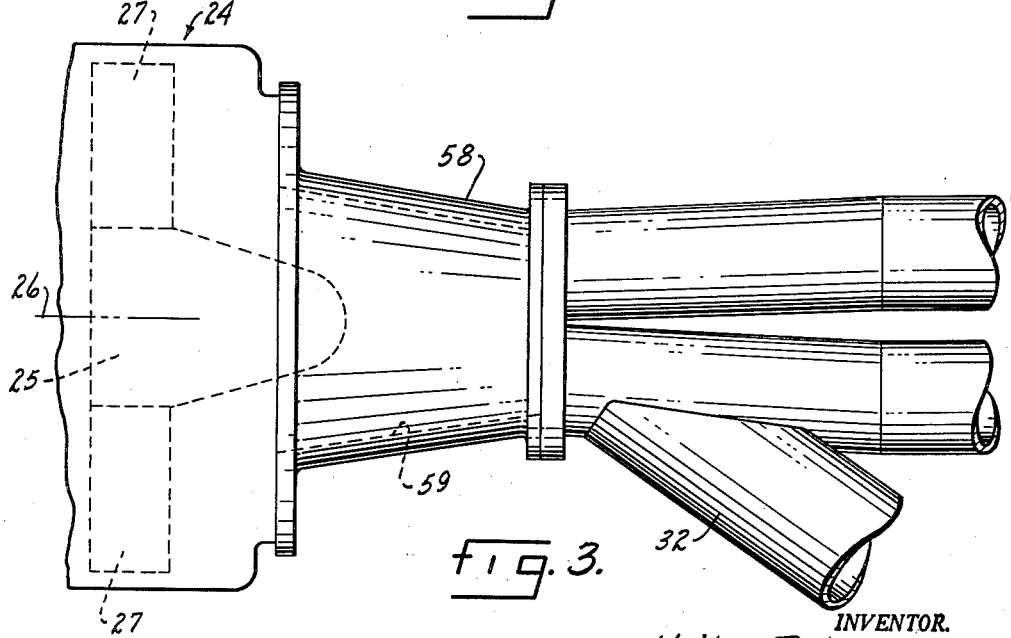
FIGURE 3 is a similar but modified form of FIGURE 2.

In FIGURE 3, I have shown a variant form in which the exhaust pipes empty into a common plenum chamber or duct 58 which has a diverging throat 59 leading to the turbine. Other than this, the parts and numerals are the same. Instead of the exhaust gases passing to an energy converter, I merely bring them into a common plenum chamber and then to the turbine.

Figure 4:
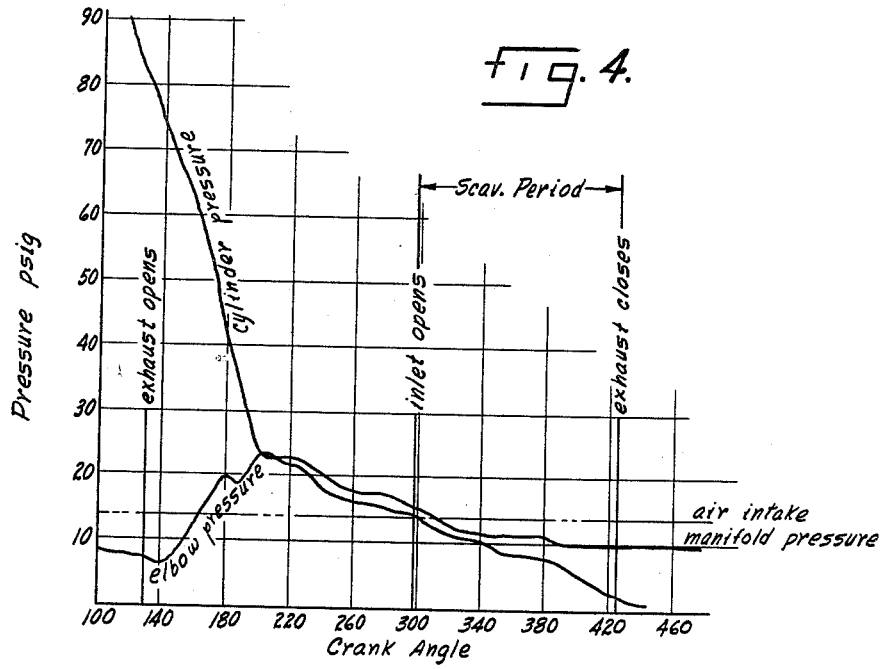
FIGURE 4 is a chart showing pressures plotted against time in a conventional supercharged engine with partial admission.

The use, operation and function of my invention are as follows:

A partial admission system is old and well known. Each of the pipes empties into a separate nozzle ring at the turbine and is totally separate from the others. In short, each pipe empties only into a part of the turbine. The disadvantage of that system is that the flow of gases through the system is sluggish since the exhaust products from any one pipe only have a portion of the turbine through which they can travel in getting out. In a sense, this clogs the entire system. An example is shown in FIGURE 4 in which various pressures are plotted against crank angle at the low pressure end of the diagram. It will be noted that as the cylinder pressure drops after the exhaust valve or port opens, the pressure in the exhaust elbow begins to rise since the hot gases cannot get out through the turbine fast enough. The pressure in the exhaust elbow rises above the air intake manifold pressure and at about the point where it equals the cylinder pressure the two flatten out and fall off gradually. Scavenging starts when the inlet valve opens and it will be noted in FIGURE 4 that the cylinder and elbow pressures are still above the air manifold pressure. This means that scavenging will not start immediately and, in fact, reverse scavenging or at least some reverse scavenging may take place. In any event, scavenging is inefficient since the cylinder pressure and exhaust elbow pressure stay above the air manifold pressure at least in the initial part of the scavenging period.

Figure 5:
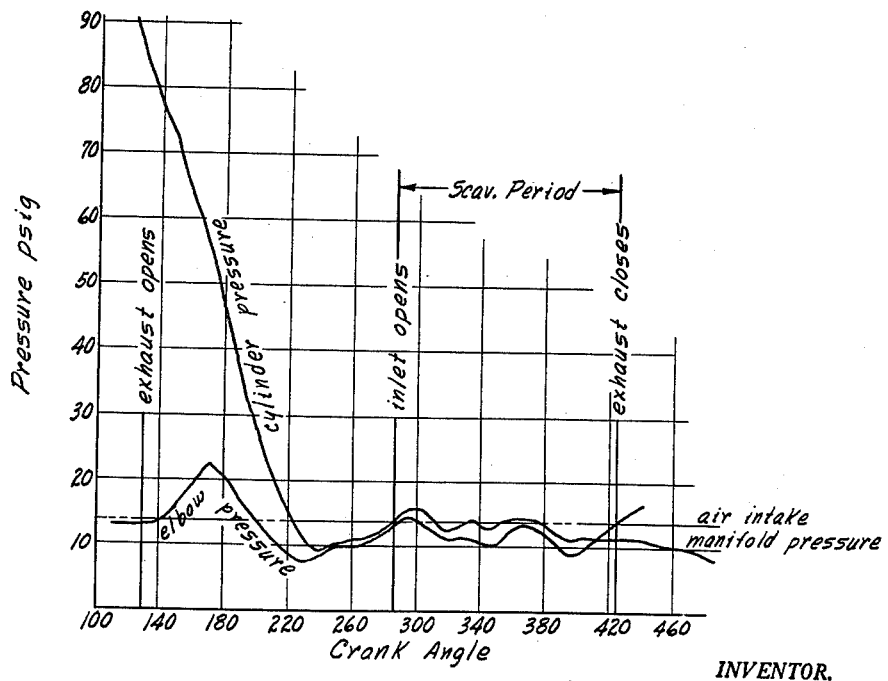
FIGURE 5 is a chart similar to FIGURE 4 showing a full admission system.

In the FIGURE 3 form, full admission to the turbine is gained by all the exhaust gases. Accordingly, the exhaust system will not be restricted. As shown in the chart in FIGURE 5, the cylinder pressure drops rapidly after the exhaust valve opens and the exhaust elbow pressure starts to rise but immediately drops off. When scavenging starts at the inlet valve opening, these two pressures are below the inlet manifold pressure. Scavenging between inlet opening and exhaust closing is good as both of these exhaust pressures stay more or less below manifold pressure. During the scavenging period there may be a reflected pulse or wave, meaning a wave that strikes the common plenum chamber and reflects back through the system. This will be noted in FIGURE 5 where the cylinder and exhaust elbow pressures tend to rise during the scavenging period.

The chart shown in FIGURE 6 is representative of the FIGURE 2 form. This is a combination of a full admission system, such as in FIGURES 3 and 5, with an energy converter, such as in FIGURE 2. It will be noted that the cylinder pressure drops rapidly. The exhaust elbow pressure starts to rise and it immediately flattens out and the two of them enter the scavenging period when the inlet valve opens well below the air manifold pressure. It will also be noted that during the entire scavenging period the two exhaust pressures stay below the air manifold pressure. There will be complete and effective scavenging during the entire scavenging period. There is no reflective wave since the energy convertor stops it off. Nor is the system sluggish since there is full admission of all of the exhaust gases to the turbine. There is no build-up of back pressure in the exhaust elbow and the reflective wave is completely avoided. Since there is good scavenging and a differential pressure between the inlet and exhaust manifold during the scavenging period, pumping losses will be at a minimum. At the same time, the turbine will respond rapidly to load acceleration.

Each of the exhaust pipes has a relatively small diameter and, therefore, small volume. The total volume of all of the exhaust pipes taken together is considerably less than the volume of a full exhaust manifold, the so-called constant pressure system. By using individual pipes instead of a constant pressure system, very little energy is lost in the exhaust passages.

In the FIGURE 2 form, as the gases pass through the throat of the energy converter, their velocity increases substantially causing a pressure drop. Thereafter the high velocity gases expand out through the diffuser into the turbine. The energy convertor thus has the double effect of supplying the turbine with quite high velocity gases and, at the same time, forming a dam or block against reflected pressure waves.

While I have spoken primarily in terms of four cycle engines, it should be understood that the system may be applied to a two cycle engine.

The system can be said to have the following main advantages.

There is a minimum of loss in the exhaust system between the cylinders and the turbine since volumes are held at a minimum and are far less than a full single manifold, the so-called constant pressure system.

The turbine will respond rapidly to load changes, commonly referred to as rapid turbine response, and will not lag behind the engine.

The FIGURE 2 form will have no reflected wave, and pumping losses will be at a minimum.

In both forms there will be full admission to the turbine and the exhaust system will not suffer from restriction causing sluggishness and high back pressures.

The energy convertor in FIGURE 2 will completely block out reflected waves so that good scavenging will take place during the scavenging period.

While I have shown and described two forms of my invention and suggested others, it should be understood that suitable additional modifications, changes, substitutions, and alterations may be made without departing from the invention's fundamental theme. The principal embodiments of the invention are shown in FIGURES 1, 2, 3, 5 and 6. The chart in FIGURE 4 is representative of a partial admission system which is old and well known but is included for purposes of comparison. With these and other changes and variations in mind, it is wished that the invention be unrestricted, except as by the appended claims.

I claim:

1. An exhaust system for use with an engine having a turbocharger with a turbine wheel, comprising a plurality of exhaust pipes, all of the exhaust pipes coming together in a common chamber, the cross sectional area of the passage of all said exhaust pipes being approximately the same at all points, and a venturi in the common chamber having an inlet to which all of the exhaust pipes individually communicate, and an outlet from the common chamber.

2. An exhaust system for an engine having a turbocharger with a turbine wheel, comprising a plurality of exhaust pipes each being connected to at least one of the cylinders of the engine, all of the exhaust pipes coming together in a common chamber, the cross sectional area of the passage of all said exhaust pipes being approximately the same at all points, and a venturi in the common chamber having an inlet to which all of the exhaust pipes individually communicate, and an outlet connected to the turbocharger to openly communicate with the turbine wheel on a full admission basis.

References Cited in the file of this patent

UNITED STATES PATENTS

| | | |
|---|---|---|
| 2,206,193 | Kadenacy | July 2, 1940 |
| 2,230,666 | Martin et al. | Feb. 4, 1941 |
| 2,306,277 | Oswald | Dec. 22, 1942 |
| 2,581,668 | Kadenacy | Jan. 8, 1952 |
| 2,678,529 | Buchi | May 18, 1954 |
| 2,841,951 | Whitcomb | July 8, 1958 |

FOREIGN PATENTS

| | | |
|---|---|---|
| 829,024 | France | Mar. 7, 1938 |
| 352,912 | Great Britain | Aug. 13, 1931 |
| 792,123 | Great Britain | Mar. 19, 1958 |